Oct. 6, 1925.

J. BARRETT 1,556,476

COUPLER

Filed Aug. 11, 1924

James Barrett
INVENTOR

BY Victor J. Evans
ATTORNEY

WITNESS:

Patented Oct. 6, 1925.

1,556,476

UNITED STATES PATENT OFFICE.

JAMES BARRETT, OF ARCHBALD, PENNSYLVANIA.

COUPLER.

Application filed August 11, 1924. Serial No. 731,486.

*To all whom it may concern:*

Be it known that I, JAMES BARRETT, a citizen of the United States, residing at Archbald, in the county of Lackawanna and State of Pennsylvania, have invented new and useful Improvements in Couplers, of which the following is a specification.

This invention relates to couplers for connecting the air line between the cars of a train.

The principal object of the invention is the provision of a coupler which will automatically couple the meeting ends of the air line of a train, when the cars are brought into close proximity to each other, which eliminates the necessity of a trainman stepping between the trains to make the connection.

Another object resides in the construction of an automatic coupler which is flexible to permit bending of the coupling when the cars are traveling round a turn in the track.

A further object is to provide an air line coupling wherein the pressure of air in the line serves to hold the coacting parts in coupling position.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1:
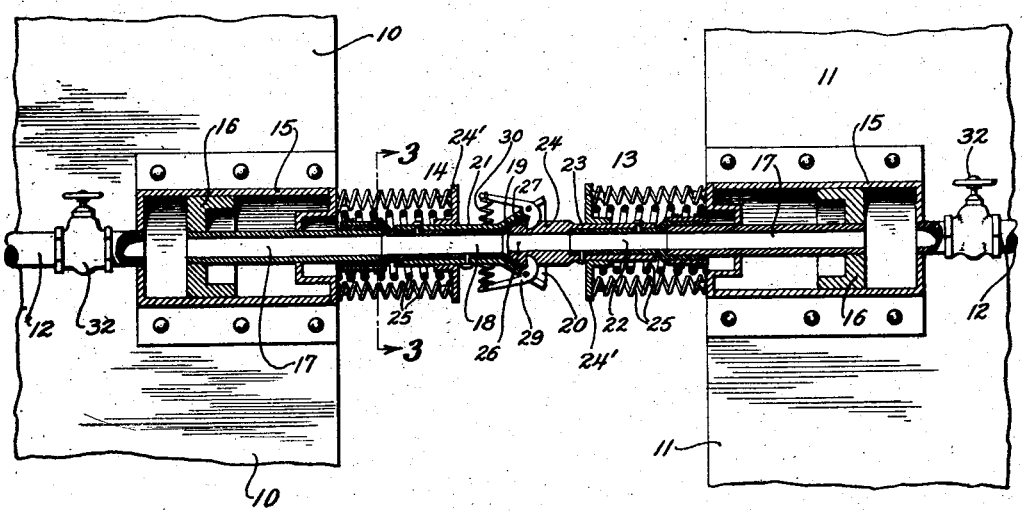
Figure 1 is a bottom plan view of the meeting ends of a pair of cars showing my invention in section applied thereto.
Figure 2:
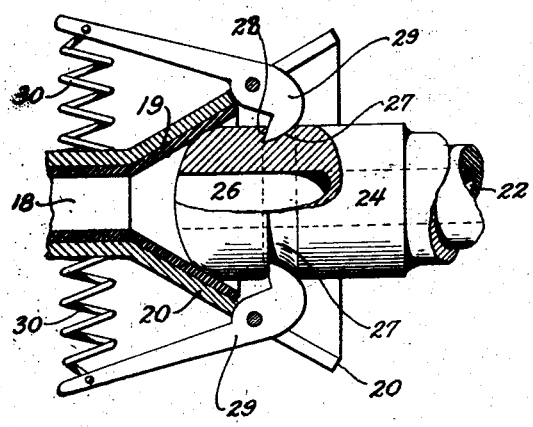
Figure 2 is an enlarged detail sectional view through a portion of the coupling.
Figure 3:
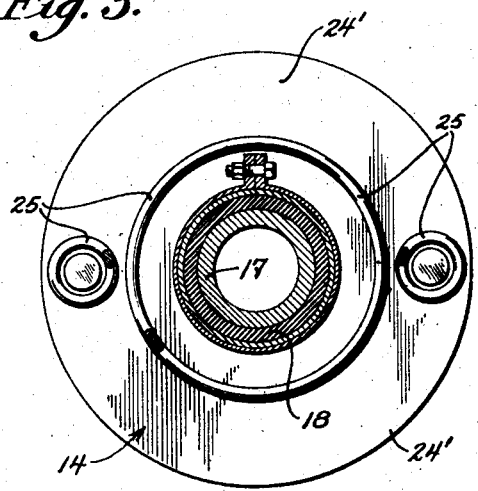
Figure 3 is a transverse sectional view on the line 3—3 of Figure 1.

Referring more particularly to the drawing, the reference numerals 10 and 11 designate the meeting ends of a pair of cars, along the underside of which is arranged an air line pipe 12, which pipe carries the air from the engine to the cars which constitute the train. Each car is provided with a male coupling mechanism 13 at one end, and a female coupling mechanism 14 at the opposite end, it being understood that the male coupling of one car co-acts with the female coupling of the next adjacent car. Each male and female coupling mechanism includes a construction which is identical with the exception that the co-acting parts are slightly different. Each male and female mechanism comprises a cylinder 15 carried by the underside of the car at the end thereof, and which cylinders receive the ends of the pipes 12. Slidable in the cylinder 15 is a piston or plunger 16 having a hollow rod 17 which extends beyond the outer end of the cylinder. Secured to the free end of the piston or plunger rod of the female mechanism 13 is one end of a flexible rubber hose 18, the other end of the hose being flared to form a lining or cushion 19 for a cup shaped member 20. The member 20 is provided with a sleeve portion 21 which encircles the major portion of the hose, but which terminates short of the end of the piston to provide a flexible joint between the rod and the member 20. The member 20 is secured to the hose in any suitable manner such as by rivets or like fastening elements. The end of the piston rod of the male mechanism 13 is also provided with a flexible rubber hose 22, over which extends the sleeve 23 of a head 24 and which head is carried by the hose. The head 24 co-acts with the cup shaped member when the parts are in coupled position as clearly shown in Figure 1 of the drawing. The sleeves 21 and 23 each support a disk 24', and interposed between each disk and the adjacent end wall of the cylinders 15 are springs 25, which serve to return the co-acting parts to normal position after the same have been moved out of axial alignment with each other which occurs when the cars are passing around a curve in the track. The head 24 is provided with a bore 26 which permits the air to flow from one car to the other without interruption, and the same is also formed with an annular groove 27, one wall of which is angularly disposed as at 28. Dogs 29 are pivotally mounted upon the cup shaped member, the nose of each of which is curved and is adapted to automatically ride over the curved portion of the head 24 when the air line is to be coupled, after which the nose co-acts with the annular wall 27 to lock the coupling together. In order to hold the dog in engagement with the head at all times, there is provided a spring 30 which is interposed between the tail of the dog and the sleeve portion of the cup shaped member.

In operation, it is presumed that the air line of two cars is to be coupled. The cars are moved toward each other until the head 24 of one car enters the cup shaped member 20 of the other car. As the head enters the cup shaped member, the dogs ride over the head into co-acting engagement with the wall 27, and at the same time, the flared portion 19 of the rubber hose tends to absorb any shock when the parts come together and also seals the joint between the cup shaped member and the head to prevent leakage of air at the joint. When the male and female mechanisms have been connected, the valves 32 arranged in the pipe line are opened to permit the air to flow uninterrupted from one car to another. As the air enters the cylinders, the same backs up against the pistons so that a pressure is constantly maintained for forcing the head and cup shaped member together. It will be noted that by providing each mechanism with a flexible connection, the same will bend during the turning of the car on a curve for effecting the flow of air through the coupling. The piston in the cylinders also acts as a cushion during the coupling on a pipe line as there is always a certain amount of air trapped in the space behind each piston. When it is desired to uncouple the pipe lines, the tails of the dogs are manually depressed against the tension of the springs 30 to disengage the dogs from the head.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In combination with the meeting ends of a pair of cars, a cylinder secured to the ends of each of said cars, an air line pipe leading to each cylinder, a piston slidable in each cylinder, a hollow piston rod extending through each of said pistons and carried thereby, and co-acting elements carried by the free end of the rods for permitting the flow of air from one air line pipe to the other, and a flexible hose between the rods and the respective co-acting means, the end of one of said hose extending into one of said co-acting elements for forming a seat for the other co-acting element.

In testimony whereof I have affixed my signature.

JAMES BARRETT.